US011331175B2

(12) United States Patent
Jackson

(10) Patent No.: US 11,331,175 B2
(45) Date of Patent: May 17, 2022

(54) DENTAL FLOSS INSERTION DEVICE

(71) Applicant: Thomas F. Jackson, Inverness, IL (US)

(72) Inventor: Thomas F. Jackson, Inverness, IL (US)

(\*) Notice: Subject to any disclaimer, the term of this patent is extended or adjusted under 35 U.S.C. 154(b) by 193 days.

(21) Appl. No.: 16/423,135

(22) Filed: May 27, 2019

(65) Prior Publication Data

US 2020/0261194 A1    Aug. 20, 2020

Related U.S. Application Data

(60) Provisional application No. 62/807,719, filed on Feb. 19, 2019.

(51) Int. Cl.
*A61C 15/04*    (2006.01)

(52) U.S. Cl.
CPC .......... *A61C 15/045* (2013.01); *A61C 15/046* (2013.01); *A61C 15/047* (2013.01)

(58) Field of Classification Search
CPC ... A61C 15/046; A61C 15/047; A61C 15/048; A61C 15/045; A61C 15/04; D05B 87/00; D05B 87/02; B25H 51/10; B25H 20/02; B65H 51/10; B65H 20/02
USPC .................. 132/323, 324, 326, 327; 223/99; 28/207.1; 112/223, 224, 225; 606/146; 226/176, 177, 186; 221/43, 44
See application file for complete search history.

(56) References Cited

U.S. PATENT DOCUMENTS

| | | |
|---|---|---|
| 3,833,009 A | 9/1974 | Bennington |
| 4,064,883 A | 12/1977 | Oldham |
| 4,691,404 A * | 9/1987 | Tarrson .................... A46B 3/18 15/144.1 |
| 4,738,271 A * | 4/1988 | Bianco ................. A61C 15/046 132/323 |
| 5,050,625 A | 9/1991 | Siekmann |
| 5,279,314 A | 1/1994 | Poulos et al. |
| 5,423,338 A | 6/1995 | Hodge et al. |
| 5,735,299 A | 4/1998 | Kaltenbach |
| 5,823,207 A * | 10/1998 | Bushman ............. A61C 15/047 132/323 |

(Continued)

FOREIGN PATENT DOCUMENTS

| | | |
|---|---|---|
| EP | 0481589 A1 | 4/1992 |
| EP | 0750902 A2 | 1/1997 |

(Continued)

OTHER PUBLICATIONS

Extended European Search Report, Application No. 20155924.2-1126, dated Jul. 13, 2020, European Patent Office.

*Primary Examiner* — Tatiana L Nobrega

(57) ABSTRACT

A dental floss insertion device for inserting an end of a length of dental floss into an enclosed oral space. The device may include a body and a tip attached to the body and cooperating with the body to define a floss guide path. A first roller may be positioned on a first side of the guide path and a second roller may be positioned on a second side of the guide path. The second roller may be moveable toward and away from the first roller to open and close a nip that receives the length of floss, thereby allowing a user to apply a compressive force on a piece of floss located between the first and second rollers while simultaneously rolling the second roller to advancing the end of the length of floss along the guide path, through the distal orifice, and into an enclosed oral space.

9 Claims, 5 Drawing Sheets

(56) References Cited

U.S. PATENT DOCUMENTS

| | | | |
|---|---|---|---|
| 5,868,149 A | | 2/1999 | Yang |
| 5,878,758 A | | 3/1999 | Bacino et al. |
| 6,029,849 A | * | 2/2000 | Meshulam ........... B65H 37/005 156/577 |
| 7,730,572 B2 | | 6/2010 | Weiss |
| 7,739,379 B1 | | 6/2010 | Vahalia et al. |
| 7,954,196 B1 | | 6/2011 | Nault-Richter |
| 8,061,372 B1 | | 11/2011 | Allen |
| 2006/0011212 A1 | | 1/2006 | Achepohl et al. |
| 2008/0115799 A1 | * | 5/2008 | Weiss ................... A61C 15/043 132/328 |
| 2008/0202549 A1 | * | 8/2008 | Weiss ..................... A46B 7/023 132/328 |
| 2011/0041870 A1 | * | 2/2011 | Kalbfeld .............. A61C 15/046 132/325 |
| 2016/0278896 A1 | * | 9/2016 | Zhou ...................... A61C 17/22 |

FOREIGN PATENT DOCUMENTS

| | | |
|---|---|---|
| WO | 01/45583 A1 | 6/2001 |
| WO | 2013/000208 A1 | 1/2013 |

* cited by examiner

DENTAL FLOSS INSERTION DEVICE

CROSS-REFERENCE TO RELATED APPLICATION

This application claims the benefit of and priority to U.S. Provisional Patent Application No. 62/807,719, filed Feb. 19, 2019, the entire contents of which are hereby incorporated by reference herein.

BACKGROUND

The present disclosure relates to dental hygiene and, more specifically, to a dental floss threading device that facilitates insertion of one end of a length of dental floss into an enclosed oral space.

Dental appliances and fixtures such as braces, bridges, fixed retainers, and prosthetics that are attached to teeth and/or implants present unique dental hygiene challenges. By their nature, these items define fully enclosed or encircled spaces (hereinafter an "enclosed oral space") that traditional brushing and flossing are often unable to adequately clean. More specifically, because enclosed oral spaces are completely encircled or enclosed by the dental appliance or fixture and the patient's teeth or gingival tissue, it is impossible for a user holding both ends of a length of floss in the traditional manner to pass the length of floss through the enclosed oral space to facilitate cleaning thereof. Failure to properly clean these spaces can lead to plaque build-up, which in turn can compromise the health of the surrounding teeth, tissue, and/or the functioning of the dental appliance.

Several dental hygiene devices and techniques have been developed to help clean enclosed oral spaces like the ones described above. One such device is an interdental brush, which is an extremely small brush that is designed to be inserted endwise into the enclosed oral space. While interdental brushes can be effective for some oral cleaning needs, they are still too large to fit into very small or very tight enclosed oral spaces, such as those associated with braces, bridges, fixed retainers, and prosthetics like those discussed above. Another device for cleaning enclosed oral spaces is a specially manufactured floss in which one or both ends of the floss has been treated to make it more stiff than traditional floss. Often referred to as "leader floss" or "threader floss," the stiffened end is intended to facilitate endwise insertion of the floss into the enclosed oral space. Leader floss can be effective for certain enclosed oral spaces, but in many situations it can be extremely difficult for an individual, who is frequently working in a mirror, to maneuver the leader floss into the enclosed oral space. Moreover, even if the tip of the leader floss can be inserted into the enclosed oral space, in many cases the stiffened end is still not stiff enough to allow the user to push the end of the leader floss completely through the enclosed oral space to facilitate a thorough cleaning.

SUMMARY

In some aspects, a dental floss insertion device is provided for inserting an end of a length of floss into an enclosed oral space. The dental floss insertion device may include a body at least partially defining a floss guide path configured to receive the end of the length of floss. The guide path may open to an exterior of the body. A tip may be located on a distal end of the body and may define a distal orifice that communicates with the floss guide path. A floss advancing mechanism may be positioned along the guide path and may include a portion that is moveable relative to the body for advancing the end of the length of floss along the guide path and through the distal orifice.

The tip may be a first tip having a first profile. The first tip may be detachable from and attachable to the body. The dental floss insertion device may further include a second tip having a second profile different from the first profile. The second tip may be detachable from and attachable to the body. The portion that is moveable relative to the body may include a cylindrical outer surface adapted to engage and grip the length of floss for advancing the end of the length of floss along the guide path toward the distal orifice. The portion that is moveable relative to the body may be rotatable about an axis, and the axis may be moveable relative to the body toward and away from guide path.

In some configurations, the portion that is moveable relative to the body may include a roller having an outer surface, and a portion of the outer surface may extend outwardly from the body to permit a user to exert a compressive force on the length of dental floss by way of the roller by urging the roller toward the guide path while also rotating the roller to advance the length of dental floss along the guide path. The body may define a proximal orifice configured to receive the end of the length of dental floss, and the guide path may extend from the proximal orifice, through the body, and through the tip to the distal orifice. The guide path may also include a proximal portion that defines an entry axis along which the length of dental floss enters the body, and a distal portion that defines an exit axis along which the length of dental floss exits the body. The entry axis and the exit axis may define an included angle of at least about 120 degrees.

The portion that is moveable relative to the body may include a first roller rotatable about a first axis and a second roller rotatable about a second axis. The first roller and the second roller may cooperate to define a nip that is configured to engage the length of dental floss. The second roller may be movable toward and away from the first roller to open and close the nip.

In other aspects, a dental floss insertion device is provided for inserting an end of a length of dental floss into an enclosed oral space. The device may include a body at least partially defining a floss guide path configured to receive the end of the length of floss. A tip may be located on a distal end of the body and may define a distal orifice that communicates with the floss guide path. A first roller may be positioned on a first side of the guide path and may be rotatable about a first axis. A second roller may be positioned on a second side of the guide path and may be rotatable about a second axis for advancing the end of the length of floss along the guide path and through the distal orifice. The second axis may be moveable toward and away from the first axis.

A portion of the second roller may extend outside the body and may be configured to permit a user to exert a compressive force on the floss by way of the second roller while simultaneously rolling the second roller to advance the floss along the guide path. The second roller may be rotatable about a pin that defines the second axis, and the pin may be received within a slot defined by the body. The tip may be a first tip having a first profile and may be detachable from and attachable to the body. The dental floss insertion device may also include a second tip having a second profile different from the first profile, and the second tip may be detachable from and attachable to the body. The first roller and the second roller may cooperate to define a nip that is configured to engage the length of dental floss, and the second roller may be movable toward and away from the first roller to open and close the nip. The second roller may comprise a thermoplastic elastomer.

In still other aspects, a method for inserting an end of a length of dental floss into an enclosed oral space is provided and includes inserting the end of the length of dental floss into a floss guide path of a dental floss insertion device, the dental floss insertion device including a body at least partially defining the floss guide path, a tip located on a distal end of the body and defining a distal orifice that communicates with the floss guide path, and a floss advancing mechanism including a roller that is rotatable about an axis and moveable relative to the body toward and away from the guide path. The method may also include moving the roller toward the guide path to apply a compressive force on the length of dental floss, and rotating the roller about the axis to advance the end of the length of dental floss toward the distal orifice.

Moving the roller toward the guide path may include moving a pin that defines the axis along a slot defined by the body. Applying a compressive force on the length of dental floss may include deforming the roller.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
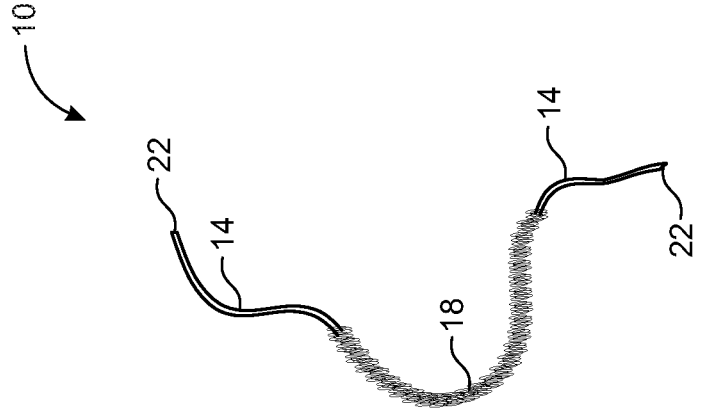
FIG. 1 is a plan view of a length of leader floss that includes relatively stiff end portions and a relatively flexible and compressible center cleaning portion.

FIG. 1 illustrates a length of floss 10 of a type generally known in the art of dental hygiene as "leader floss." The illustrated length of floss 10 includes a pair of relatively stiff leader portions 14 and a relatively spongy, flexible, and compressible central cleaning portion 18. Leader floss like the floss 10 was developed to facilitate cleaning of enclosed oral spaces, such as those defined by braces, bridges, fixed retainers, and prosthetics that are attached to teeth and/or implants, which generally cannot be reached using traditional flossing techniques. In use, a user holds one stiff leader portion 14 of the floss 10 between the user's fingers and inserts an end 22 of the floss 10 into the enclosed oral space to be cleaned. The stiffness of the leader portion 14 is intended to permit the user to push the end 22 of the floss 10 through one side of the enclosed oral space and out the other side of the enclosed oral space. Once the end 22 has been pushed through the enclosed oral space the user grasps the end and pulls the leader portion 14 of the floss 10 through the enclosed oral space until the cleaning portion 18 is positioned in the enclosed oral space. The user may then maneuver the cleaning portion 18 within the enclosed oral space to facilitate cleaning thereof. As noted above, it can be extremely difficult for users to insert the end 22 of the floss 10 into the enclosed oral space and push the end 22 through to the other side of the enclosed oral space, particularly when the enclosed oral space is relatively small.

Figure 3:
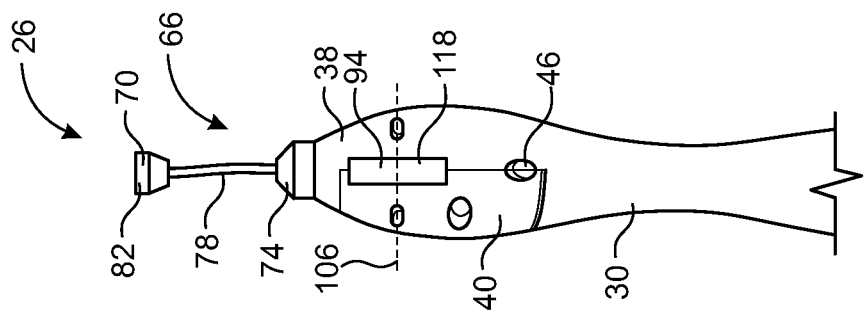
FIG. 3 is an enlarged front view of a distal end of the dental floss insertion device of FIG. 2 showing a floss advancing mechanism and a floss guide.
Figure 2:
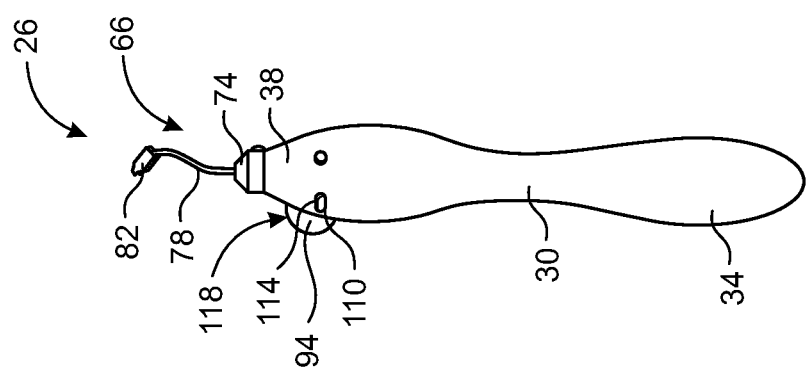
FIG. 2 is a side view of a dental floss insertion device for inserting an end of a length of floss into an enclosed oral space.
Figure 4:
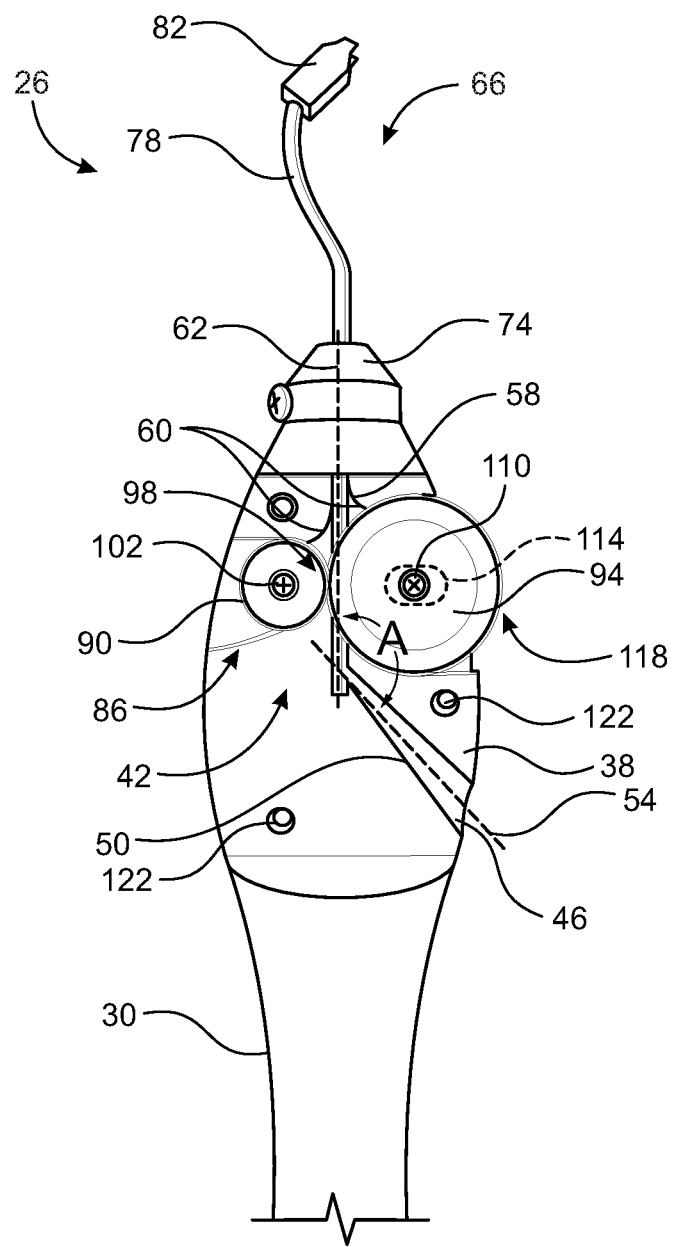
FIG. 4 is an enlarged side view of the dental floss insertion device of FIG. 2 with a cover removed to show a floss insertion channel, the floss advancing mechanism, and the floss guide.

FIGS. 2-4 illustrate a dental floss insertion device 26 configured to assist a user in inserting the end 22 of the leader floss 10 into the enclosed oral space and pushing the end 22 through to the other side of the enclosed oral space. In the exemplary, illustrated configuration, the device 26 includes a generally hour-glass shaped body 30 having a proximal end 34 and a distal end 38. A cover 40 is removably attached to the proximal end 34 of the body for reasons discussed below. The body 30 houses and supports functional components of the device 26 and also functions as a handle. While an hour-glass shape is shown, the body 30 may be formed in a variety of shapes and sizes to achieve substantially any desired ergonomic configuration.

The body 30 at least partially defines a floss guide path 42 (FIG. 4) positioned generally at the distal end 38 of the body 30. The guide path 42 is configured to receive the end 22 of the length of floss 10. The illustrated guide path 42 includes a proximal orifice 46 that opens to the exterior of the body 30. The proximal orifice 46 is positioned and configured to receive the end 22 of the length of floss 10. As described further below, in use a user begins by inserting the end 22 of the length of floss 10 through the proximal orifice 46, thereby inserting the end 22 into the guide path 42.

The guide path 42 includes a proximal portion 50 that extends from the proximal orifice 46 inwardly into the body 30. In the illustrated configuration, the proximal portion 50 defines entry axis 54 along which the length of dental floss 10 enters the body 30. The guide path 42 also includes a distal portion 58 that defines an exit axis 62 along which the length of dental floss 10 exits the body 30. The distal portion 58 may include a substantially funnel shaped entry walls 60 to help guide the length of floss 10 along the guide path 42, as discussed further below. As shown in FIG. 4, the entry axis 54 and the exit axis 62 are positioned at an angle A relative to one another. In the illustrated configuration the angle A is an obtuse angle that allows the leader portion 14 of the floss 10 to smoothly transition from the proximal portion 50 of the guide path 42 to the distal portion 62 of the guide path 42 generally without binding or sticking. In some embodiments of the device 26 the angle A is at least about 120 degrees.

The device 26 also includes a tip 66 located on the distal end 38 of the body 30. The tip 66 forms a portion of the guide path 42 and defines a distal orifice 70 that communicates with the guide path 42. Thus, in the illustrated configuration, the guide path 42 extends from the proximal orifice 46, through the body 30, and through the tip 66 to the distal orifice 70. The tip 66 includes a base 74 that, in some embodiments, may be removably attached to the distal end 38 of the body 30. Non-limiting examples of structural configurations that can be used to make the base 74 removably attachable to the distal end 38 include snap fits, threaded couplings, set screws, twist locks, cam locks, latching members, and slidable couplings.

The tip 66 also includes a floss guide 78 that extends away from the base 74. The floss guide 78 is a conduit in the form of a hollow tube that defines a portion of the guide path 42. As discussed further below, a plurality of floss guides 78 may be provided in a variety of shapes to facilitate use of the device 26 with a variety of different enclosed oral spaces. In this manner, when the device 26 is provided with a detachable tip 66, a user can attach and detach tips 66 having differently configured floss guides 78 depending on the specific application. To protect the user's gums and other soft tissue, the distal end of the floss guide 78 is provided with an insertion tip 82 formed of a comfort-providing material, such as a thermoplastic elastomer or similarly compliant material. The insertion tip 82 may be removable from the distal end of the floss guide 78, or may be permanently fixed to the floss guide 78, for example by overmolding the insertion tip onto the floss guide 78.

To advance the end 22 of the floss 10 along the guide path 42, a floss advancing mechanism 86 is provided and is positioned along the guide path 42. As best shown in FIG. 4, the floss advancing mechanism 86 includes a first roller 90 positioned on a first side of the guide path 42, and a second roller 94 positioned on a second side of the guide path 42. The first roller 90 and the second roller 94 cooperate to define a nip 98 that is configured to engage the length of floss 10. The first roller 90 is rotatable about a first axis 102 that, in the illustrated example, is fixed with respect to the body 30. The second roller 94 is rotatable about a second axis 106 that is moveable relative to the body 30 toward and away from the guide path 42 and the first roller 90. Thus, the second roller 94 is movable toward and away from the first roller 90 to open and close the nip 98. In the illustrated configuration, the above-described function is provided by way of a pin 110 that defines the second axis 106 and is received within a slot 114 defined by the body 30 and extending in a crossing-direction relative to the guide path 42.

The second roller 94 includes a generally cylindrical outer surface 118 that is adapted to engage and grip the length of floss 10 for advancing the end 22 of the length of floss 10 along the guide path 42 and toward the distal orifice 70. In this regard the outer surface 118 may be substantially smooth or lightly textured. In some configurations, the second roller 94 and possibly also the first roller 90, or at least the outer surfaces thereof, may be formed of a compliant material such as a thermoplastic elastomer, which produces a relatively high coefficient of friction with respect to the leader portion 14 of the length of floss.

As seen in FIGS. 2-4, a portion of the second roller 94 extends outside the body 30. When the leader portion 14 of the length of floss 10 is positioned in the nip 98, a user may push or otherwise urge the second roller 94 toward the guide path 42, thereby exerting a compressive force on the floss 10 by way of the second roller 94. Substantially simultaneously, the user may rotate the second roller 94 about the second axis 106 to advance the length of floss 10 along the guide path 42. In embodiments such as those described above where the second roller 94 is a compliant material such as thermoplastic elastomer, when the user applies the compressive force to the floss 10 the outer surface 118 of the second roller 94 may be deformed.

The second roller 94 therefore provides a portion of the device 26 that is moveable relative to the body 30 for advancing the end 22 of the length of floss 10 along the guide path 42 and through the distal orifice 70. More specifically, because the second roller 94 is carried by the pin 110, and because the pin 110 is mounted in the slot 114, the second roller 94 may be moved generally toward and away from the guide path 42 to open and close the nip 98. With the nip 98 opened, a user may insert the end 22 of the length of floss 10 into the guide path 42 until the leader portion 14 is positioned in the nip between the first roller 90 and the second roller 94. As the end 22 of the length of floss 10 proceeds past the nip 98, the funnel shaped entry walls 60 of the distal portion 58 may guide the tip 22 toward the exit axis 62 to prevent the tip 22 from becoming jammed inside the device 26. With the leader portion 14 positioned in the nip, the user may apply a compressive force to the leader portion 14 by pressing on the portion of the second roller 94 that extends outside the body 30. Pressing in this manner moves the pin 110 along the slot 114, closes the nip 98 by moving the second roller 94 toward the guide path 42, and compresses the leader portion 14 of the floss 10 between the first roller 90 and the second roller 94. While continuing to press on the second roller 94, the user may then rotate the second roller 94 about the second axis 106 to advance the end 22 of the length of floss 10 toward the distal orifice 70.

The combination of simultaneously rolling the second roller 94 and pressing the second roller 94 against the leader portion 14 of the floss 10 allows the user to apply substantial force to the leader portion 14 of the floss 10 to urge the leader portion 14 along the guide path 42. While holding the device 26 such that the distal orifice 70 is substantially aligned with the enclosed oral space the user wishes to clean, this process can be repeated until the end 22 of the floss 10 passes through the distal orifice 70 and enters the user's enclosed oral space. Thereafter, continued rolling and pressing of the second roller 94 may be used to urge the end 22 of the floss 10 completely through the enclosed oral space until the end 22 can be grasped by the user.

With the leader portion 14 of the length of floss 10 positioned in the enclosed oral space, the user can either remove the device 26 from the length of floss 10 as discussed below, or the user can use the device 26 to facilitate cleaning of the enclosed oral space. If the user removes the device 26 from the length of floss 10 the user can simply grasp both ends of the floss 10 and clean the enclosed oral space by manually manipulating the ends 22 of the length of floss 10. Alternatively, the user may leave the length of floss 10 positioned inside the device 26 and use the device 26 to manipulate the floss 10 within the enclosed oral space. More specifically, the user may apply pressure to the portion of the second roller 94 that extends outside the body 30 while preventing rotation of the second roller 94, thereby substantial fixing the length of floss 10 within the device 26. With the length of floss 10 substantially fixed within the device 26, the device 26 may be used as a handle that facilitates maneuvering one end 22 of the length of floss 10 while the user's other hand grasps and maneuvers the opposite end 22 of the length of floss 10 to clean the areas around and within the enclosed oral space.

When it is desired to remove the length of floss 10 from the device 26, the user can release the pressure on the second roller 94 to open the nip 98. With the nip 98 open, the cleaning portion 18 of the floss 10 can pass through the guide path 42. The user can then pull the device 26 completely off the length of floss 10.

In FIG. 4, the cover 40 has been removed to expose the floss guide path 42, and the floss advancing mechanism 86. By making the cover 40 removable, users can access these components for cleaning and/or clearing of jamming or tangling of floss that might occur during floss insertion, use, or floss extraction. In the illustrated configuration the cover 40 is secured by screws (not shown) that thread into openings 122 provided in the handle 30. In other configurations the cover 40 may be secured by a combination hinge and latch elements, resilient detents, sliding arrangements, magnets, and the like.

In the illustrated configuration, the floss advancing mechanism 86 is positioned in the body 30 along the distal portion 58 of the guide path 42 between the vertex of the angle A and the tip 66. In other configurations the floss advancing mechanism may be positioned along the proximal portion 50 of the guide path 42. In still other configurations the floss advancing mechanism 86 may define the proximal orifice 46. While the floss advancing mechanism 86 may be located in a variety of positions, locating the floss advancing mechanism 86 as close to the tip 66 as practical allows more of the leader portion 14 of the floss 10 to be pushed through the distal orifice 70 and into the enclosed oral space before the cleaning portion 18 of the floss 10 arrives at the floss advancing mechanism 86. This may be beneficial because for many styles of leader floss, once the cleaning portion 18 arrives at the floss advancing mechanism 86, the ability of the device 26 to push the end 22 of the floss 10 through the enclosed oral space may be reduced.

Figure 5:
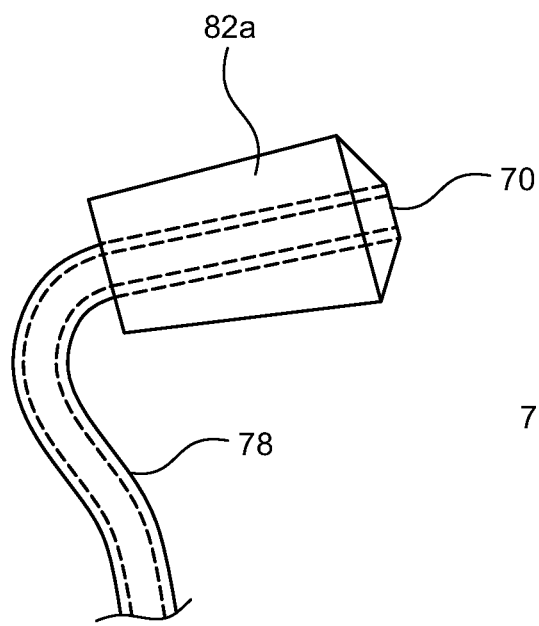
FIG. 5 is an enlarged side view of a first embodiment of an insertion tip of the dental floss insertion device of FIG. 2.
Figure 6:
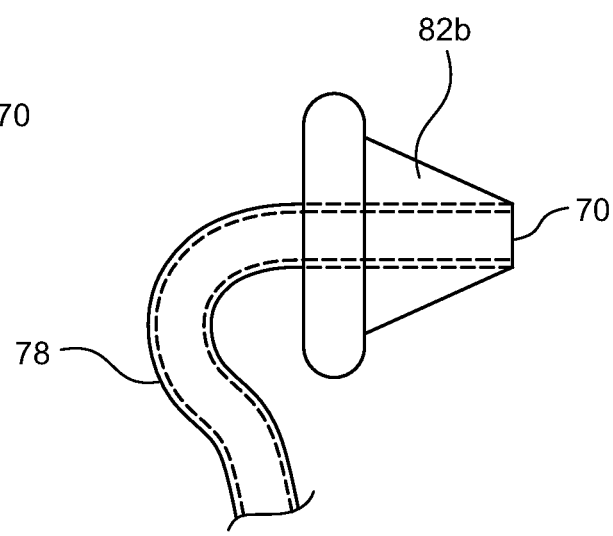
FIG. 6 is an enlarged side view of a second embodiment of an insertion tip of the dental floss insertion device of FIG. 2.

Referring also to FIGS. 5 and 6, the device 26 may be provided with different types of insertion tips. The insertion tip 82a of FIG. 5 is substantially wedge shaped. It is generally wider than it is tall and users may find it particularly effective for inserting the end 22 of the length of floss 22 into an enclosed oral space such as a prosthetic seam, which is the long straight area located, for example, where a multi-tooth implant or hybrid prosthetic contacts the gingiva or alveolar ridge. In contrast, the insertion tip 82b of FIG. 6 is generally conical in shape, and users may find it effective for inserting the end 22 of the length of floss 22 into an enclosed oral space defined by one or more sharp corners, such as the spaces between adjacent braces or the corner between a prosthesis, the gingival tissue, and a natural tooth. The insertion tips 82a, 82b preferably are formed of a compliant material and may either be removable from the floss guide 78 or permanently attached thereto. If the insertion tips 82a, 82b are configured to be removable, they generally may be installed on and removed from the floss guide 78 by hand, with the resulting friction between the insertion tip 82a, 82b and the floss guide 78 being sufficient to retain the insertion tip 82a, 82b on the end of the floss guide 78 during use.

Figure 7:
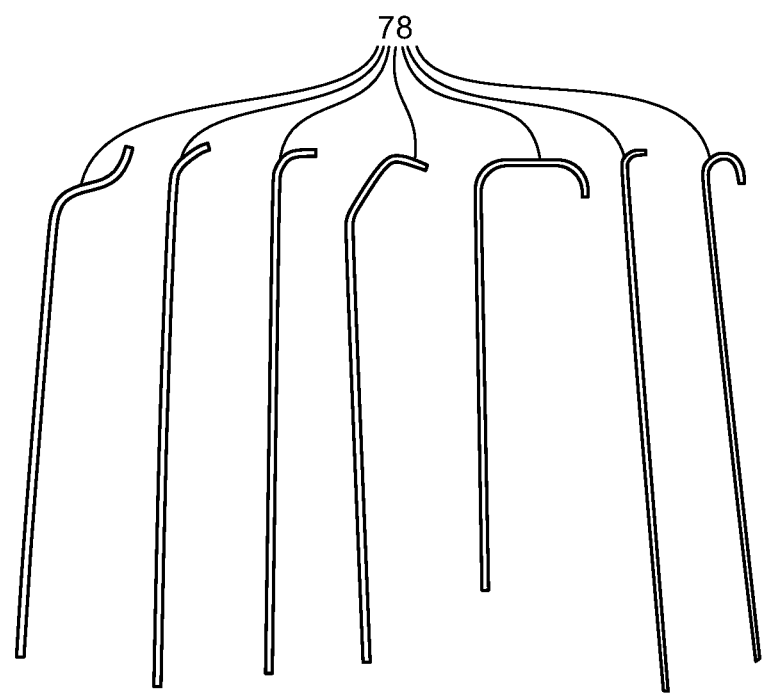
FIG. 7 is an elevational view showing seven floss guide alternative embodiments, each of which may be used in combination with the dental floss insertion device of FIG. 2.

Referring also to FIG. 7, several alternative configurations of floss guides 78 are shown. Each floss guide 78 has a slightly different configuration or profile that users may find make a particular floss guide 78 particularly well suited for inserting the end 22 of the length of floss 10 into a particular enclosed oral space. In embodiments where the insertion tips 82a, 82b are removable, additional flexibility or customization to a particular user's needs can be obtained by installing either the insertion tip 82a, the insertion tip 82b, or another style insertion tip onto any one of the floss guides 78. In this regard, a single device 26 may be provided with a plurality of removable tips 66, with each tip 66 having a different profile or configuration of floss guide 78 and/or insertion tip 82 to facilitate cleaning a particular enclosed oral space or set of enclosed oral spaces. Thus, a given device 26 may include a first tip 66 having a first profile and being detachable from and attachable to the body 30, as well as a second tip 66 having a second profile different from the first profile and also being detachable from and attachable to the body 30. Additional tips having additional profiles different from the first and second profiles may also be provided to accommodate a particular user's needs.

Figure 8:
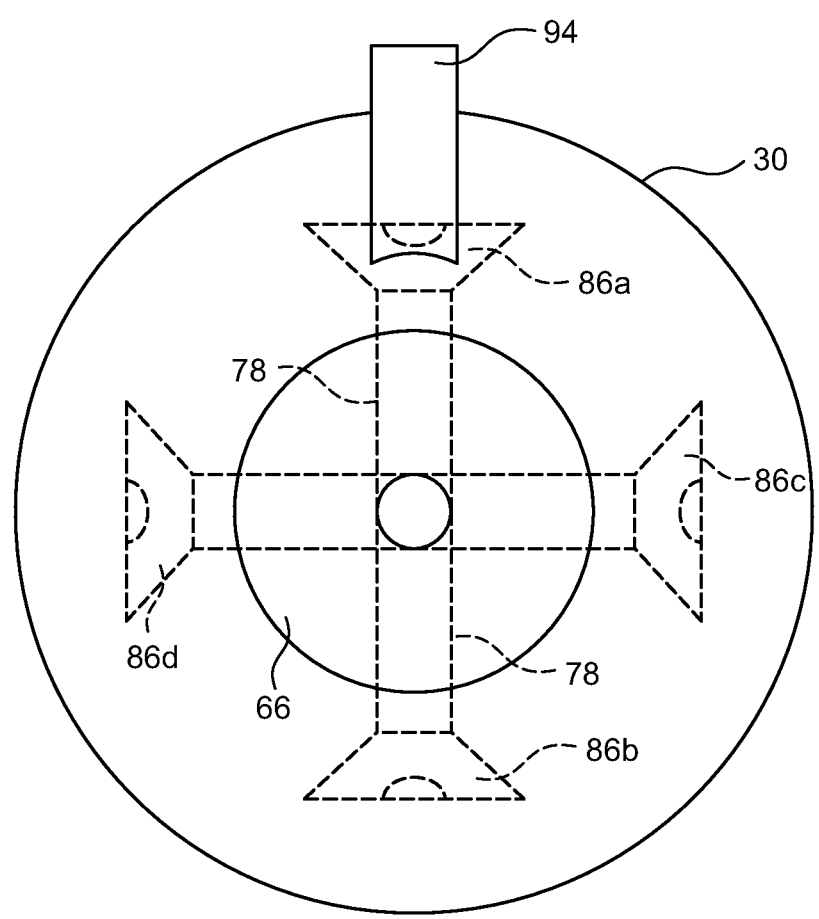
FIG. 8 is an end view of the dental floss insertion device of FIG. 2 showing a plurality of angular positions of a device tip relative to a device roller.

With reference also to FIG. 8, in addition to being detachable from the body 30 to facilitate use of a tip 66 having a differently configured floss guide 78, the tip 66 may also be positionable on the body 30 in a plurality of angular orientations relative to the location of the second roller 94. This may be desirable because, particularly when the length of floss 10 is held fixed within the device 26 during cleaning of the enclosed oral space, the device 26 will generally need to be held in the same orientation so the user can hold the second roller 94 with his or her thumb. Thus, allowing the tip 66 to be rotated relative to the position of the second roller 94 facilitates use of the device with either the right or left hand while accessing enclosed oral spaces on either the upper or lower jaw.

As shown in FIG. 8, the tip 66 may be positionable in, for example, four different angular orientations (each shown in phantom) spaced generally about the longitudinal axis of the body 30 including a first orientation 86a in which the floss guide 78, when viewed as shown in FIG. 8, extends toward the second roller 94, a second orientation 86b in which the floss guide 78 extends away from the second roller 94, a third orientation 86c in which the floss guide 78 extends substantially perpendicular to the second roller 94 in a first direction, and a fourth orientation 86d in which the floss guide 78 extends substantially perpendicular to the second roller 94 in a second direction opposite the first direction. The four above-described orientations 86a, 86b, 86c, 86d may be achieved by attaching the tip 66 to the body using substantially any latching configuration that includes provisions for reorienting the tip 66, such as snap fits, threaded couplings (e.g. quarter turn couplings), set screws, twist locks, cam locks, latching members, slidable couplings, and the like. The body 30 and/or the tip 66 may be provided with markings or indicia that assist a user in positioning the tip 66 in a desired orientation 86a, 86b, 86c, 86d. It should be appreciated that more or fewer angular orientations for the tip 66 may be provided by appropriately configuring the detachable connecting structure used to secure the tip 66 to the body 30.

Figure 9:
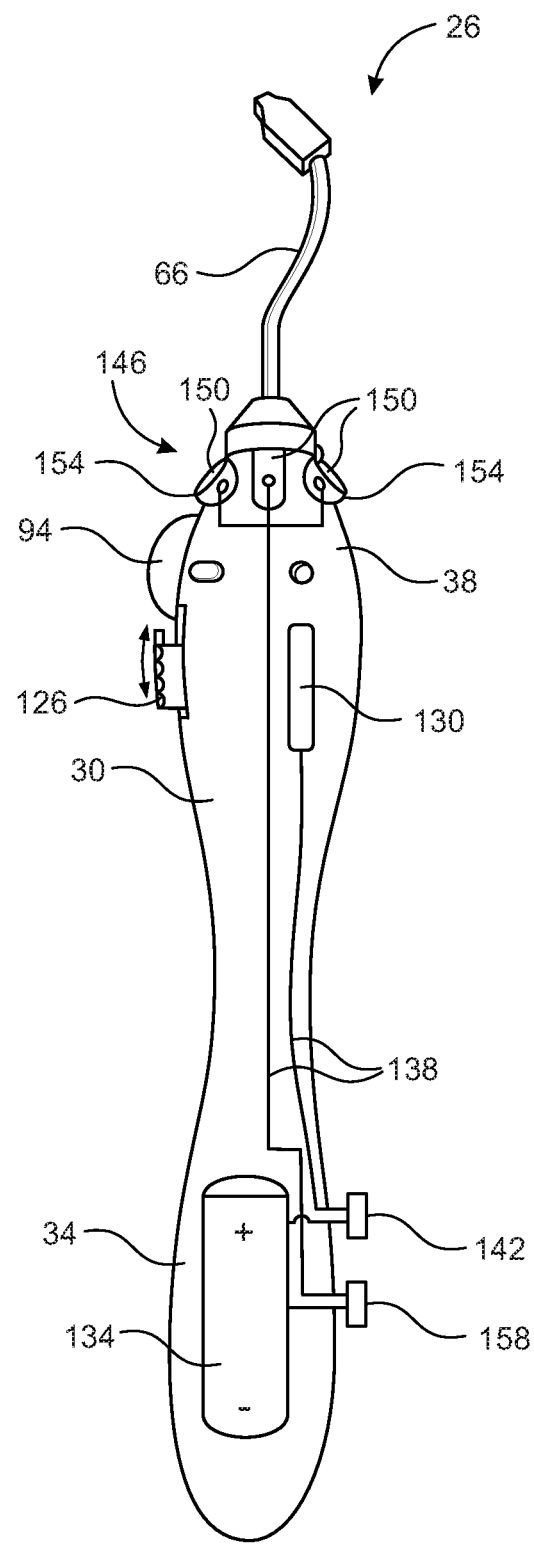
FIG. 9 is a side view of the dental floss insertion device of FIG. 2 including a plurality of optional accessory features.

Referring also to FIG. 9, the device 26 may also include one or more optional accessory features to simplify and/or enhance the user experience. One such optional accessory feature is a latching member 126 that is moveable between a disengaged or unlatched position in which the latching member 126 does not contact the second roller 94 and the second roller 94 is freely rotatable about the pin 110, and an engaged or latched position in which the latching member 126 engages the second roller 94 and prevents or limits rotation of the second roller 94 about the pin 110. The latching member 126 may be configured with a detent mechanism so that when the latching member 126 is moved to the engaged position it remains in the engaged position and prevents or limits rotation of the second roller portion 94 without further intervention by the user. In this way, when a user has the floss in a desired position, the user can move the latching member 126 to the engaged position, thereby securing the floss in the desired position so the user can manipulate the device 26 without having to manually prevent rotation of the second roller 94.

Another optional accessory feature is a vibrating mechanism 130 that vibrates the device 26 to enhance oral cleaning. The vibrating mechanism 130 may be or include any suitable mechanism capable of imparting vibrations including but not limited to various configurations of motorized eccentric weight assemblies, piezoelectric transducers, and the like. In each case, the vibrating mechanism 130 may be powered by a battery 134, which may be housed within the proximal end 34 of the handle 30, connected to the vibrating mechanism 130 by suitable circuitry 138. An on/off switch 142 may be provided to control the vibrating mechanism 130.

Another optional accessory feature of the device 26 illustrated in FIG. 9 is a light assembly 146. In the illustrated configuration the light assembly includes a plurality of individual lights 150 radially spaced apart around the distal end 38 of the handle 30. Each light 150 may include one or more LEDs and a reflector assembly 154 for directing light emitted from the LEDs generally in the direction of the tip 66 to illuminate the area of the mouth that is being flossed Like the vibration mechanism 130, the light assembly 146 may be connected via suitable circuitry 138 to the battery 134 and operated by an on/off switch 158.

It should be appreciated by those skilled in the art that the switches 142, 158 and circuitry 138 illustrated in FIG. 9 for providing power to the vibrating mechanism and the light assembly 146 are presented in a simplified form. More sophisticated circuitry including micro-controllers, PCBs, wireless communication circuits, and the like may be included to provide higher level functions and to interface with external control devices, such as a smart phone or dedicated control mechanism. Non-limiting examples of higher lever functions enabled by such circuitry might include driving the vibrating mechanism 130 at multiple or variable speeds, providing timing features, providing audible indicators, controlling the brightness of the lights, flashing the lights at predetermined times, and the like. Although FIG. 9 shows a single battery 134 and common circuitry 138 powering the vibration mechanism 130 and the light assembly 146, multiple, dedicated batteries and circuits may also be used.

Various features of the invention are set forth in the following claims.

What is claimed is:

1. A dental floss insertion device for inserting an end of a length of dental floss into an enclosed oral space, the device comprising:
   a body at least partially defining a floss guide path configured to receive the end of the length of floss, the body having a proximal end, an opposing distal end and defining a longitudinal axis extending between the proximal and distal ends;
   a tip located on the distal end of the body and defining a distal orifice that communicates with the floss guide path;
   a first roller positioned on a first side of the guide path and rotatable about a first axis;
   a pin received within a slot defined by the body; and,
   a second roller positioned on a second side of the guide path opposite the first side and rotatable about a second axis that is defined by the pin, the first and second axes being spaced apart such that the first and second axes are not coincident and do not intersect, the second roller rotates to advance the end of the length of floss along the guide path and through the distal orifice, wherein the pin and the second roller are moveable toward and away from the first axis and the first roller to permit a user to exert a compressive force on the floss by way of the second roller, wherein the second roller includes a generally cylindrical outer surface, wherein the guide path includes a proximal portion that defines an entry axis and a distal portion that defines an exit axis, wherein the entry axis and the exit axis define an included angle of at least about 120 degrees, wherein the distal portion of the guide path is substantially aligned with a longitudinal extent of the body, and wherein the proximal portion of the guide path is angled with respect to the longitudinal extent of the body, such that a proximal orifice configured to receive the end of the length of dental floss opens to an exterior side of the body.

2. The dental floss insertion device of claim 1, wherein the guide path extends from the proximal orifice, through the body, and through the tip to the distal orifice.

3. The dental floss insertion device of claim 1, wherein a portion of the second roller extends outside the body.

4. The dental floss insertion device of claim 1, wherein the tip is a first tip having a first profile, the first tip being detachable from and attachable to the body, the dental floss insertion device further comprising a second tip having a second profile different from the first profile, wherein the second tip is detachable from and attachable to the body.

5. The dental floss insertion device of claim 1, wherein the first roller and the second roller cooperate to define a nip that is configured to engage the length of dental floss, and wherein the second roller is movable toward and away from the first roller to open and close the nip.

6. The dental floss insertion device of claim 1, wherein the second roller comprises a thermoplastic elastomer.

7. The dental floss insertion device of claim 1, wherein the tip is rotatable relative to the body to a plurality of angular orientations.

8. The dental floss insertion device of claim 1, wherein the generally cylindrical outer surface of the second roller is one of substantially smooth or lightly textured.

9. The dental floss insertion device of claim 1, wherein the generally cylindrical outer surface is formed of a compliant material that enhances a coefficient of friction between the outer surface and the end of the length of floss.

\* \* \* \* \*